(12) United States Patent
Shih

(10) Patent No.: US 10,855,920 B1
(45) Date of Patent: Dec. 1, 2020

(54) POWER SUPPLYING AND IMAGE PROCESSING SYSTEM AND OPERATING METHOD THEREOF

(71) Applicants: Inventec (Pudong) Technology Corporation, Shanghai (CN); INVENTEC CORPORATION, Taipei (TW)

(72) Inventor: Chen-Hsiang Shih, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 58 days.

(21) Appl. No.: 16/435,909

(22) Filed: Jun. 10, 2019

(30) Foreign Application Priority Data

May 28, 2019 (CN) .......................... 2019 1 0452112

(51) Int. Cl.
*H04N 5/232* (2006.01)
*G05B 13/02* (2006.01)
(Continued)

(52) U.S. Cl.
CPC ..... *H04N 5/23241* (2013.01); *G05B 13/0265* (2013.01); *G06F 1/266* (2013.01); *G06K 9/00973* (2013.01); *H02M 3/1582* (2013.01); *H04L 12/10* (2013.01); *G06F 2213/0026* (2013.01)

(58) Field of Classification Search
CPC .......... H04N 5/23241; H04N 5/232411; H04L 12/10; H04L 12/02; H04L 12/40045; H02M 3/1582; H02M 3/1584; H02M 3/156; G05B 13/0265; G05B 13/02; G05B 13/00; G06K 9/00973; G06K 9/00; G06F 1/266; G06F 1/26; G06F 13/4072; G06F 13/4221; G06F 2213/0026
See application file for complete search history.

(56) References Cited

U.S. PATENT DOCUMENTS

2013/0089125 A1* 4/2013 Kim ..................... H04L 12/2801
375/222
2015/0012763 A1* 1/2015 Cohen ................... H04L 67/125
713/310

(Continued)

*Primary Examiner* — Twyler L Haskins
*Assistant Examiner* — Akshay Trehan
(74) *Attorney, Agent, or Firm* — Locke Lord LLP; Tim Tingkang Xia, Esq.

(57) ABSTRACT

A power supplying and image processing system adapted to a camera comprises a boost converter, an Ethernet power circuit, a signal conversion circuit, and a host. The boost converter receives an input power to boost and output thereof. The Ethernet power circuit receives the boosted power to output a DC device power to the camera, and forwards an image signal captured by the camera. The signal conversion circuit has a first interface and a second interface with different types, receives the image signal through the electrical connection between the first interface and the Ethernet power circuit, and converts a format of the image signal. The host obtains the format-converted image signal to perform an AI operation to generate a control signal to control operations of the camera or to show an image corresponding to the format-converted image signal the on a display device.

7 Claims, 3 Drawing Sheets

(51) Int. Cl.
*H04L 12/10* (2006.01)
*G06K 9/00* (2006.01)
*G06F 1/26* (2006.01)
*H02M 3/158* (2006.01)

(56) References Cited

U.S. PATENT DOCUMENTS

2016/0094814 A1\* 3/2016 Gousev ............... G06K 9/6267
  348/143
2016/0197732 A1\* 7/2016 Burnett ................. H04L 12/10
  320/137
2017/0123470 A1\* 5/2017 Srivastava ............. G06F 1/266
2020/0076303 A1\* 3/2020 Sarkka ................. H02M 3/158

\* cited by examiner

POWER SUPPLYING AND IMAGE PROCESSING SYSTEM AND OPERATING METHOD THEREOF

CROSS-REFERENCE TO RELATED APPLICATIONS

This non-provisional application claims priority under 35 U.S.C. § 119(a) on Patent Application No(s). 201910452112.3 filed in China on May 28, 2019, the entire contents of which are hereby incorporated by reference.

BACKGROUND

1. Technical Field

The disclosure relates to a power supplying and image processing device and operating method thereof, more particularly to a power supplying and image processing device and operating method thereof, which are adapted to a camera.

2. Related Art

At present, the image monitoring system with artificial intelligence identification of people flow or traffic flow mostly obtains images through a camera or a Network Video Recorder (NVR), and then uploads the images to the cloud so that the server may process these images collected by all cameras. The cloud server generates the identification result through deep learning algorithm and transmits the result back to the host of the control center.

However, due to the increasing awareness of personal data privacy, the images captured in many occasions cannot be uploaded to the cloud based on the rule of personal data protection. On the other hand, although cloud computing has the advantage of being close to infinite computing power, the slow network speed will result in excessive delays and thus cannot meet practical requirements. In addition, the use of cloud services for artificial intelligence identification requires a lot of hardware costs.

SUMMARY

According to one or more embodiment of this disclosure, a power supplying and image processing system adapted to a camera comprising: a boost converter with a power input port, wherein the boost converter receives an input power through the power input port and converts the input power to output a boosted power; an Ethernet power circuit electrically connected to the boost converter and configured to electrically connect to the camera, wherein the Ethernet power circuit is configured to receive the boosted power to output a Direct Current (DC) power to the camera and is configured to forward an image signal captured by the camera; a signal-conversion circuit having a first interface and a second interface, wherein a type of the first interface is different from a type of the second interface, the signal-conversion circuit electrically connects to the Ethernet power circuit to receive the image signal through the first interface and converts a format of the image signal; and a host electrically connected to the signal-conversion circuit through the second interface, wherein the host is configured to obtain the format-converted image signal and perform an artificial intelligence (AI) computation according to the format-converted image signal, the AI computation is configured to generate a control signal, and the host is further configured to selectively send the control signal to at least one of the camera and a display device, wherein the control signal is configured to control an operation of the camera or show a screen on the display device; wherein the signal-conversion circuit is further configured to receive the control signal through the second interface and send the control signal to the Ethernet power circuit through the first interface, and the Ethernet power circuit is further configured to forward the control signal to the camera.

According to one or more embodiment of this disclosure, a power supplying and image processing method adapted to a camera, comprising: receiving an input power by a power input port of a boost converter; converting the input power into a boosted power by the boost converter; receiving the boosted power to output a DC power to the camera and receiving an image signal from the camera by an Ethernet power circuit electrically connected to the boost converter; receiving the image signal by a first interface of a signal-conversion circuit, with the first interface electrically connected to the Ethernet power circuit, converting a format of the image signal by the signal-conversion circuit; sending the format-converted image signal to a host through a second interface of the signal-conversion circuit, wherein a type of the first interface is different from a type of the second interface; obtaining the format-converted image signal and performing an artificial intelligence (AI) computation according to the format-converted image signal by the host, wherein the AI computation is configured to generate a control signal, and the control signal is configured to control an operation of the camera or show a screen on the display device; and selectively sending the control signal to at least one of the camera and a display device by the host.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
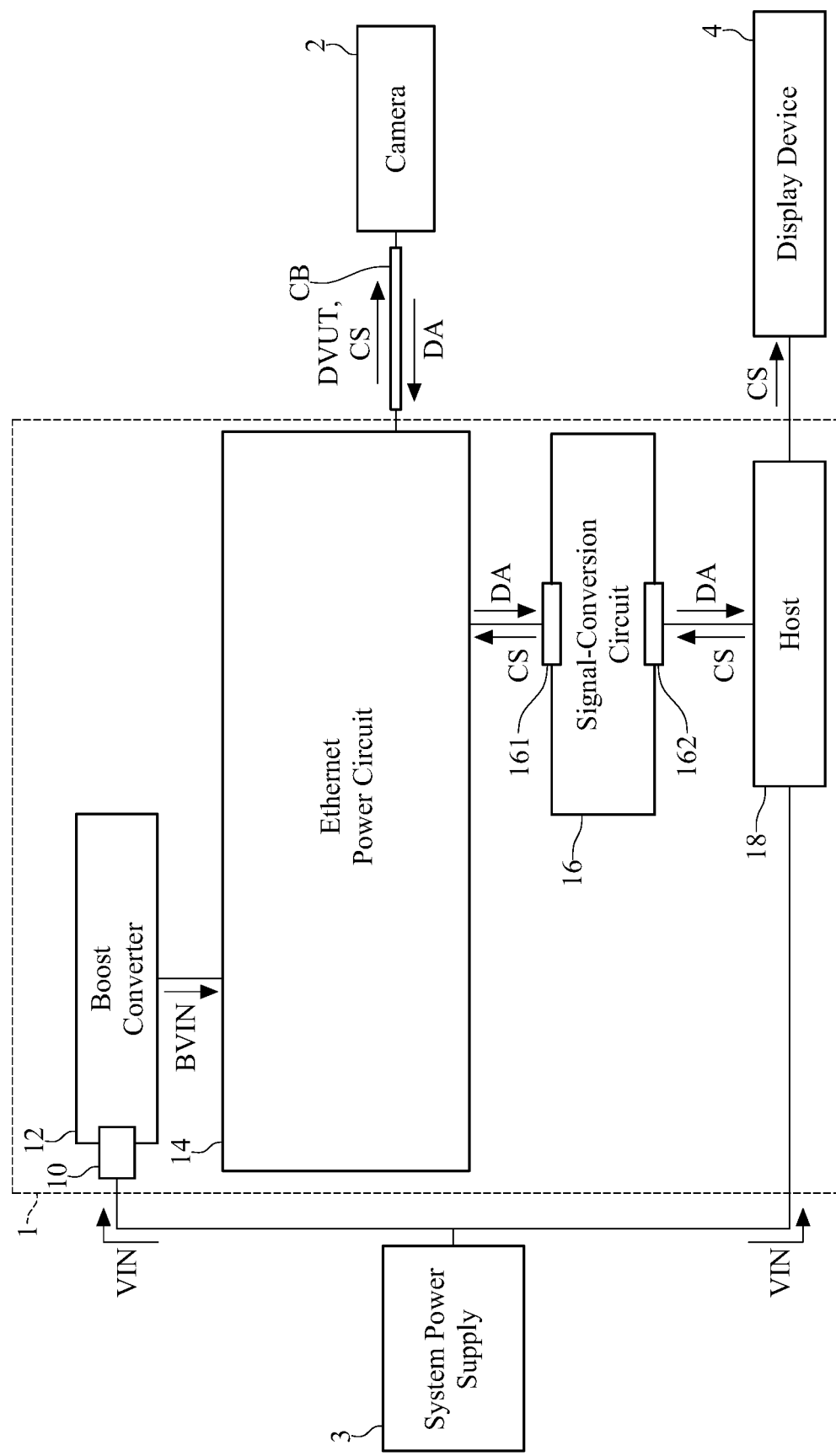
FIG. 1 is a block diagram of a power supplying and image processing system according to an embodiment of the present disclosure.

Please refer to FIG. 1, which is a block diagram of a power supplying and image processing system 1 according to one embodiment of the present disclosure. As shown in FIG. 1, the power supplying and image processing system 1 is adapted to a camera 2 and comprises a boost converter 12, an Ethernet power circuit 14, a signal-conversion circuit 16, and a host 18.

The boost converter 12 comprises a power input port 10. The boost converter 12 receives an input power VIN via the power input port 10. The boost converter 12 converts the input power VIN into a boosted power BVIN and outputs the boosted power BVIN. In practice, as shown in FIG. 1, the boost converter 12 receives the input power VIN from a system power supply 3 via the power input port 10. The system power supply 3 is a DC power supply which providing a constant voltage. For example, the system power supply 3 provides an input power VIN of 19 volts in a DC form. The boost converter 12 is a DC to DC boost converter adapted for boosting a voltage of the input power VIN to form the boosted power BVIN. For example, the boost converter 12 boosts the input power VIN of 19 volts to form the boosted power BVIN of 48 volts.

The Ethernet power circuit 14 electrically connects to the boost converter 12 and is configured to electrically connect to the camera 2. The Ethernet power circuit 14 is configured to receive the boosted power BVIN outputted by the boost converter 12 so as to output a DC power DVUT to the camera 2. In other words, the Ethernet power circuit 14 may output the DC power DVUT adapted to the camera 2 according to the boosted power BVIN. In an example, the camera 2 is an Internet Protocol camera (IP CAM) coupled externally. In addition to outputting the DC power DVUT to the camera 2 for its operation, the Ethernet power circuit 14 also receives an image signal DA captured by the camera 2. In this embodiment, the camera 2 is a photography device with a PoE (Power over Ethernet) interface. Specifically, an Ethernet cable CB is used for a connection between the Ethernet power circuit 14 and the camera 2, and the Ethernet cable CB is, for example, an RJ45 cable. Since the Ethernet cable CB is able to transmit power and data, the camera 2 may not only receive the power through the Ethernet cable CB, but also send the image data (namely "image signal DA") to the Ethernet power circuit 14 through the Ethernet cable CB.

The signal-conversion circuit 16 comprises a first interface 161 and a second interface 162. The first interface 161 and the second interface 162 have different types. The signal-conversion circuit 16 electrically connects to the Ethernet power circuit 14 via the first interface 161. The signal-conversion circuit 16 electrically connects to the host 18 via the second interface 162. The signal-conversion circuit 16 receives the image signal DA from the Ethernet power circuit 14 through the first interface 161. The signal-conversion circuit 16 may convert a format of the image signal DA and sends the image signal DA whose format has been converted to the host 18 via the second interface 162. In practice, the signal-conversion circuit 16 is an integrated circuit (IC) having different transmission interfaces, such as an Ethernet network controller whose type is Intel i350.

The host 18 electrically connects to the signal-conversion circuit 16 via the second interface 162. The host 18 is configured to obtain the format-converted image signal DA and perform an artificial intelligence (AI) computation according to the format-converted image signal DA. Said AI computation is configured to generate a control signal CS, and the host 18 is further configured to selectively send the control signal CS to at least one of the camera 2 and a display device 4 (monitor), wherein the control signal CS is configured to control operations of the camera 2 or to show a screen on the display device 4 4. In practice, the host 18 is, for example, a CPU of nVidia TX series, with well-trained neural network model installed inside, and thus the host 18 is capable of performing an event determination or behavior recognition according to the image signal DA. For example, if the host 18 determines that a specific human face appears in the image signal DA, the host 18 may send a control signal CS to control the camera to move its lens to keep track of the specific human face, or the host 18 may send another control signal to the display device 4 (monitor) located in the control center so that the control officer may perform a further confirmation.

In an embodiment, said power supplying and image processing system 1 may be implemented in a personal computer or a server, serving as a system end, while the camera 2 is an external device attached to said system end.

In an embodiment, the first interface 161 is an Ethernet transmission interface and the second interface 162 is a PCIe (Peripheral Component Interconnect Express) transmission interface. In other words, the communication between the signal-conversion circuit 16 and the host 18 is based on PCIe standard and the communication between the signal-conversion circuit 16 and the Ethernet power circuit 14 is based on the Ethernet. In an example, the signal-conversion circuit 16 can convert a data format. The signal-conversion circuit 16 is configured to convert the image signal DA with the Ethernet format, which is received through the first interface 161, into the image signal DA with the PCIe format. The signal-conversion circuit 16 further outputs the image signal DA with the PCIe format through the second interface 162.

In an embodiment, the signal-conversion circuit 16 is further configured to receive a control signal CS from the host 18 via the second interface 162 and further sends the control signal CS to the Ethernet power circuit 14 via the first interface 161, and the Ethernet power circuit 14 sends the control signal CS to the camera so as to control operations of the camera 2. Said operations of the camera 2 involves adjustments of lens directions or focal lengths of the camera 2. In this embodiment, the signal-conversion circuit 16 converts the control signal CS with a PCIe format, which is received from the host 18 via the second interface 162, into the control signal CS with an Ethernet format, so that the format-converted control signal CS (namely "the control signal with the Ethernet format") can be sent to the Ethernet power circuit 14 via the first interface 161 for the control operations of the camera 2. In practice, a two-way signal transmission comprising the control signal CS and the image signal DA can be performed between the host 18 of the system end and the camera 2.

Figure 2:
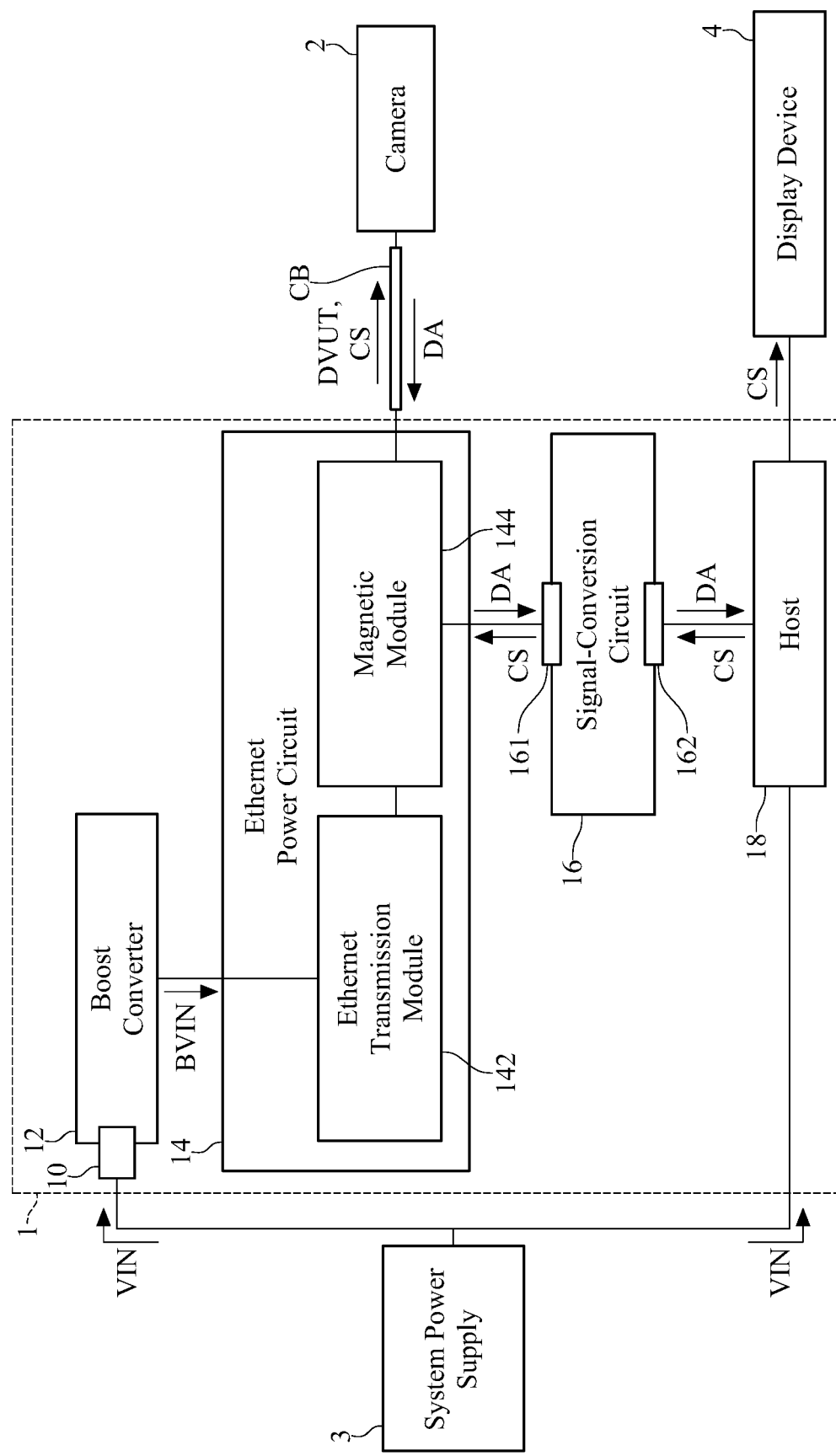
FIG. 2 is a detailed block diagram of the power supplying and image processing system according to the embodiment of FIG. 1.

In summary, regarding the power supplying and image processing system 1 of the present disclosure, the host 18 and the Ethernet power circuit 14 have different types. In order to achieve the purpose of signal transmissions, the power supplying and image processing system 1 adopts a signal-conversion circuit 16 to serve as a conversion medium for properly converting the format of the image signal DA and the format of the control signal CS, so that signals can be transmitted between the host 18 and the Ethernet power circuit 14. Please further refer to FIG. 2, which is a detailed block diagram of the power supplying and image processing system 1 according to the embodiment of FIG. 1. The embodiment of FIG. 2 is similar to the embodiment of FIG. 1. The difference between FIG. 1 and FIG. 2 lies in that the Ethernet power circuit 14 shown in FIG. 2 comprises an Ethernet transmission module 142 and a magnetic module 144.

In practice, the Ethernet transmission module 142 connects to the boost converter 12 and the magnetic module 144. The Ethernet transmission module 142 and the magnetic module 144 are connected with each other by PCB layouts. The Ethernet transmission module 142 outputs a DC power to the magnetic module 144 according to the boosted power BVIN by using the technique of Power of Ethernet (PoE). Further, the magnetic module 144 outputs the DC power DVUT to the camera 2 via an Ethernet transmission cable according to the DC power. Moreover, an external power adaptor is required to provide power to the host 18. In practice, a plurality of magnetic coils is disposed in the magnetic module 144 and is adapted to filter signal noises. The magnetic module 144 has a plurality of connecting pins adapted to be connected to Ethernet cables for transmitting power signals, data signals or control signals. In this embodiment, since both of the Ethernet transmission module 142 and the magnetic module 144 are general components that a person skilled in the art is familiar thereto, detail descriptions regarding the Ethernet transmission module 142 and the magnetic module 144 are not given here.

Figure 3:
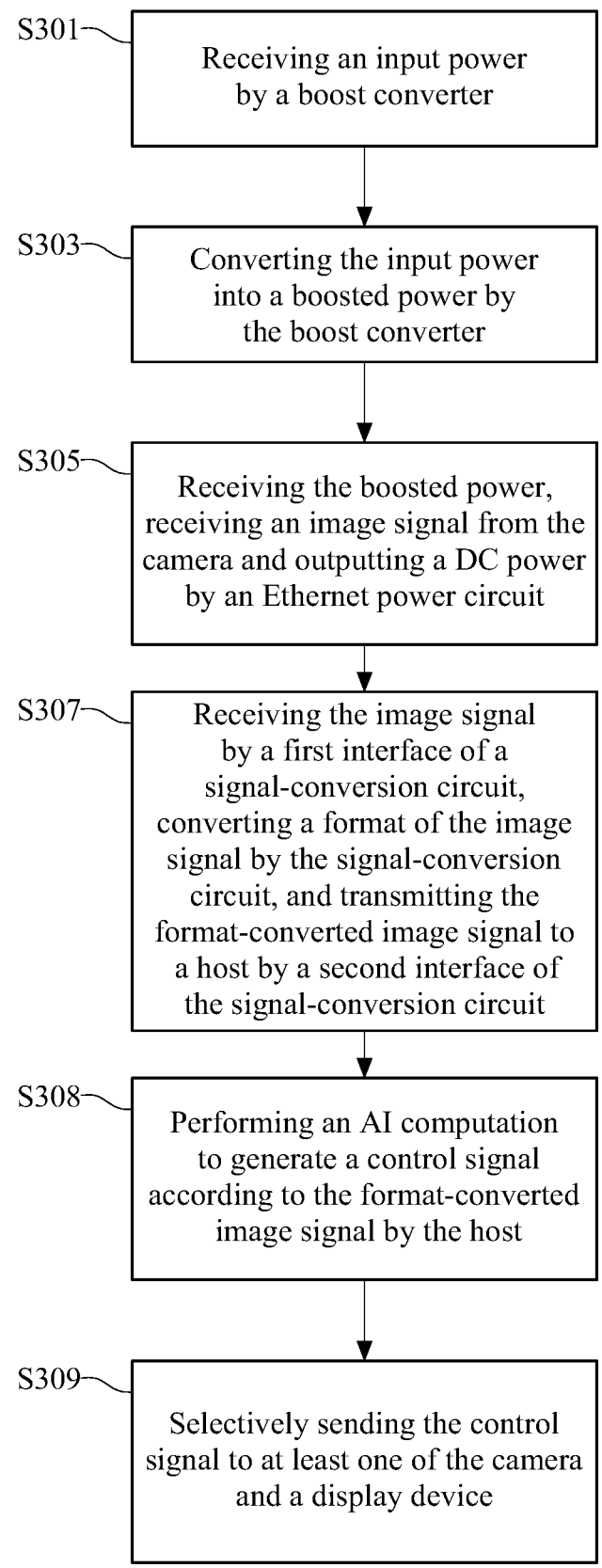
FIG. 3 is a flow chart of a power supplying and image processing method according to an embodiment of the present disclosure.

Please refer to FIG. 1 and FIG. 3. FIG. 3 is a flow chart of a power supplying and image processing method according to an embodiment of the present disclosure. The power supplying and image processing method may be implemented according to the embodiments of power supplying and image processing system shown in FIG. 1 and/or FIG. 2. As shown in the FIG. 3, in step S301, a boost converter 12 receives an input power VIN through the power input port 10. In step S303, the boost converter 12 converts the input power VIN into the boosted power BVIN. In step S305, the Ethernet power circuit 14 receives the boosted power BVIN and receives the image signal DA captured from the camera 2 so as to output the DC power DVUT. In step S307, the signal-conversion circuit 16 receives the image signal DA through the first interface 161. The signal-conversion circuit 16 converts the format of the image signal DA and transmits the format-converted image signal DA to the host through the second interface 162. In step S308, the host 18 performs an AI computation according to the format-converted image signal DA to generate a control signal CS. In step S309, the host 18 selectively sends the control signal CS to at least one of the camera 2 and the display device 4.

In an embodiment, in addition to the aforementioned steps, the power supplying and image processing method further comprises receiving the control signal CS from the host 18 via the second interface 162 and sending the control signal CS to the Ethernet power circuit 14 via the first interface 161 by the signal-conversion circuit 16, for controlling the operation of the camera 2. In an embodiment, the signal-conversion circuit 16 is configured to convert the image signal DA, which is received through the first interface 161, with the Ethernet-type format into the image signal with the PCIe-type format and further output the image signal with the PCIe-type format through the second interface 162. The conversions of the signal formats described in the above embodiment are merely used for illustration, and the power supplying and image processing method disclosed in the present disclosure is not limited to the embodiment. The detailed contents regarding transmitting power and image performed by the power supplying and image processing system 1 using the power supplying and image processing method has been disclosed in the aforementioned descriptions, so no more repetition here.

In view of the above, the present disclosure proposes a power supplying and image processing system and method thereof are to integrate a monitoring host capable of installing a neural network model in the system, thereby achieving the function of image processing with artificial intelligence in the monitoring system and performing instant data analysis and inference. In other word, behaviors such as data analysis, object detection, event determination and behavior identification may be handled on a terminal device. Therefore, the bandwidth requirement of cloud data transmission can be reduced and the response time of image processing with AI can be shortened. In addition, the present disclosure allows the user to supply the camera power without having to add a switch with power over Ethernet (PoE) technology or add an external DC power adapter. This not only reduces the expenditure, but also simplifies the entire system to only one host, so that it is easier to troubleshoot when something in the host goes wrong. The present disclosure adds an edge computing CPU module and a PSE module to a conventional monitoring system host, so that the monitoring system does not have to perform cloud computing for image processing, and the operational power may be supplied to the IP camera via the PoE interface.

What is claimed is:

1. A power supplying and image processing system adapted to a camera comprising:
   a boost converter with a power input port, wherein the boost converter receives an input power through the power input port and converts the input power to output a boosted power;
   an Ethernet power circuit electrically connected to the boost converter and configured to electrically connect to the camera, wherein the Ethernet power circuit is configured to receive the boosted power to output a Direct Current (DC) power to the camera and is configured to forward an image signal captured by the camera;
   a signal-conversion circuit having a first interface and a second interface, wherein a type of the first interface is different from a type of the second interface, the signal-conversion circuit electrically connects to the Ethernet power circuit to receive the image signal through the first interface and converts a format of the image signal; and
   a host electrically connected to the signal-conversion circuit through the second interface, wherein the host is configured to obtain a format-converted image signal and perform an artificial intelligence (AI) computation according to the format-converted image signal, the AI computation is configured to generate a control signal, and the host is further configured to selectively send the control signal to at least one of the camera and a display device, wherein the control signal is configured to control an operation of the camera or show an image corresponding to the format-converted image signal on the display device;
   wherein the signal-conversion circuit is further configured to receive the control signal through the second interface and send the control signal to the Ethernet power circuit through the first interface, and the Ethernet power circuit is further configured to forward the control signal to the camera.

2. The power supplying and image processing system according to claim 1, wherein the Ethernet power circuit comprises an Ethernet transmission module and a magnetic module electrically connected to the Ethernet transmission module, the Ethernet transmission module is configured to transmit the DC power to the magnetic module according to a Power over Ethernet (PoE) technique, the magnetic module is configured to filter a noise of the DC power and transmit the DC power and the control signal.

3. The power supplying and image processing system according to claim 1, wherein the type of the first interface is an Ethernet transmission interface and the type of the second interface is a PCIe transmission interface.

4. The power supplying and image processing system according to claim 1, wherein the signal-conversion circuit is configured to convert the image signal with an Ethernet-type format received through the first interface into the image signal with a PCIe-type format and further output the signal with the PCIe-type format through the second interface.

5. A power supplying and image processing method adapted to a camera, comprising:
  receiving an input power by a power input port of a boost converter;
  converting the input power into a boosted power by the boost converter;
  receiving the boosted power to output a DC power to the camera and receiving an image signal from the camera by an Ethernet power circuit electrically connected to the boost converter;
  receiving the image signal by a first interface of a signal-conversion circuit, with the first interface electrically connected to the Ethernet power circuit,
  converting a format of the image signal by the signal-conversion circuit;
  sending a format-converted image signal to a host through a second interface of the signal-conversion circuit, wherein a type of the first interface is different from a type of the second interface;
  obtaining the format-converted image signal and performing an artificial intelligence (AI) computation according to the format-converted image signal by the host, wherein the AI computation is configured to generate a control signal, and the control signal is configured to control an operation of the camera or show an image corresponding to the format-converted image signal on a display device; and
  selectively sending the control signal to at least one of the camera and the display device by the host.

6. The power supplying and image processing method according to claim 5, wherein a type of the first interface is an Ethernet transmission interface and a type of the second interface is a PCIe transmission interface.

7. The power supplying and image processing method according to claim 5, wherein the signal-conversion circuit is configured to convert the image signal with an Ethernet-type format received through the first interface into the image signal with a PCIe-type format and further output the data signal with the PCIe-type format through the second interface.

* * * * *